UNITED STATES PATENT OFFICE 2,308,761

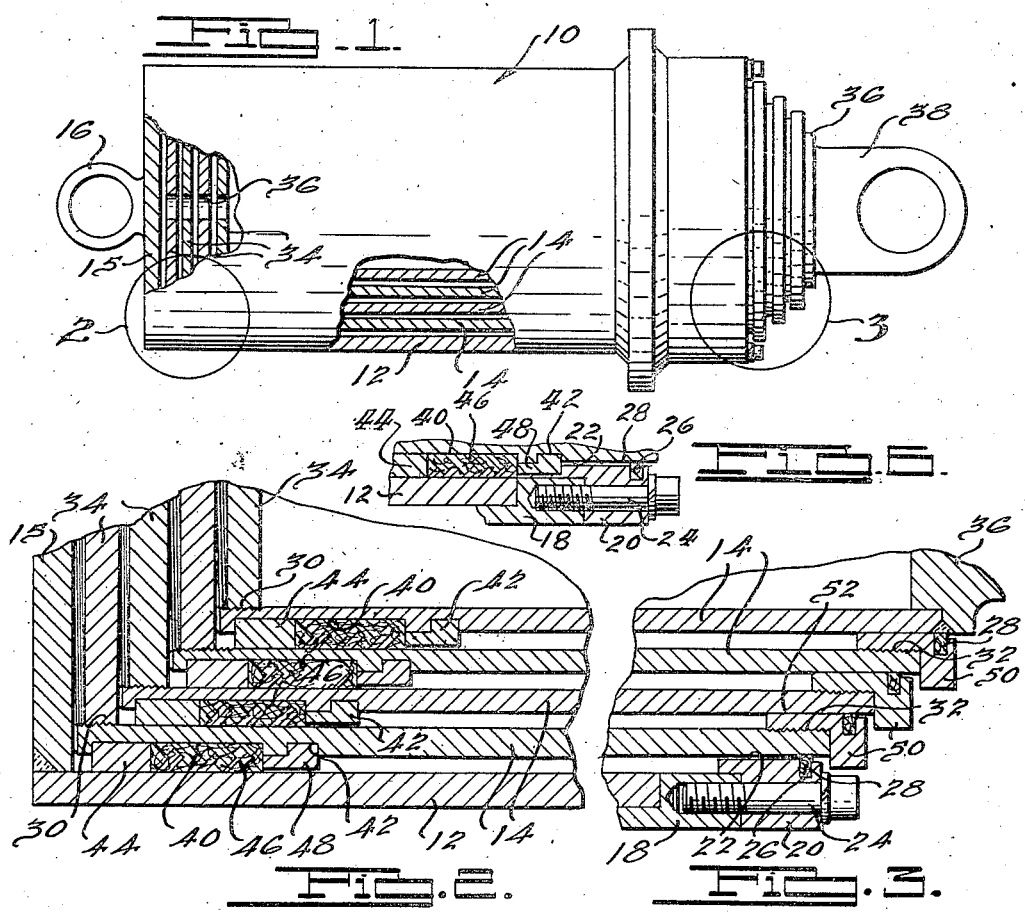

FLUID HOIST CONSTRUCTION

William L. Komph, Sr., Detroit, Mich., assignor to Gar Wood Industries, Inc., Detroit, Mich., a corporation of Michigan Application December 8, 1941, Serial No. 422,135

5 Claims. (Cl. 309—1)

The present invention relates to improvements in hydraulic hoist constructions, and particularly to improvements in telescopic hoist constructions.

One of the primary objects of the present invention is to provide improvements in hoists of the type mentioned in which the elements forming the hoist are of a relatively simple form and may be manufactured by simplified methods.

Another object of the invention is to provide an improved structure of the type mentioned in the manufacture of which relatively complicated and expensive operations may be eliminated, thereby effecting considerable manufacturing economy.

Other more specific objects of the invention are to provide an improved telescopic hoist construction in which split bronze followers and split stop rings are used and merely set into grooves formed in the hoist cylinders to form a packing box; in which the inside diameters of the cylinders are reamed and rolled, which eliminates micro-grinding; in which the outside diameters are turned and polished, which eliminates the Norton grinding operation; in which the same size threads are used in each end of each cylinder, thereby making it possible to use the same thread die; in which the sealing is on the inside bore rather than on the outside surface of the adjacent cylindrical member, so that the pressure acts on the total area of the bore; and in which welding is reduced to a minimum.

Other objects of the invention will become apparent from the following specification, the drawing relating thereto, and from the claims hereinafter set forth.

In the drawing, in which like numerals are used to designate like parts in the several views throughout:

Figure 1 is a side elevational view with parts broken away showing parts in cross section of an improved telescopic hoist construction embodying features of the present invention;

Fig. 2 is an enlarged cross-sectional view of that portion of the structure within the circle 2 of Figure 1;

Fig. 3 is a view similar to Figure 2 of that portion of the structure within the circle 3 of Figure 1;

Figs. 4 and 5 are elevational views of the follower and stop ring, respectively, shown in Figure 2; and Fig. 6 is a cross-sectional view of portions of the cylinders and showing two of such cylinders in extended position.

Referring to the drawing, a telescopic, hydraulic hoist is generally indicated at 10, which comprises an outer cylindrical member 12 having a plurality of telescopically received cylindrical elements 14 mounted therein for longitudinal movement with respect to each other. The outer cylindrical member 12 has a base plate 15 welded thereto which is provided with a pivot bearing 16 for pivotal attachment to a mounting element, such as the chassis of a dump truck. The opposite end, or head end, of the cylinder 12 has an aligned annular extension 18 fixed to the end edge thereof in which the inner surfaces of the cylinder 12 and the member 18 are flush with each other. An annular bearing member 20, having an inwardly projecting portion providing a bearing surface 22, is fixed to the edge of the member 18 by means of a plurality of screws 24, which may be suitably spaced therearound. The member 20 is provided with an annular groove 26 on the inner surface thereof and adjacent the outer edge thereof, within which a packing or sealing element 28, of suitable material, is disposed. Such sealing element 28 projects slightly inwardly of the bearing surface 22, and is adapted to bear against the outer surface of the next adjacent cylindrical member 14.

The inner cylindrical members 14 are of progressively decreasing diameter, and are disposed in telescopic or nesting relationship with respect to each other. Each of such members 14, with the exception of the innermost one, is provided with integrally threaded ends 30 and 32. A base plate 34 is threaded into the base end of each of the members 14, and is provided with a central opening 36 therethrough. The innermost member 14 is also provided with a threaded portion 30 and with the base plate 34 therein. The head end of the innermost member 14 is provided with an end cap 36, which is welded to the open head end thereof and which has formed integral therewith a pivot bearing 38 for pivotal attachment to an element such as a dump body.

It will be seen that each of the elements 14 is disposed in radially spaced relationship with respect to each other, and the outermost element 14 is disposed in similar radially spaced relationship with the outer cylinder 12. Each of the members 14 is formed with an annular groove 40, which is adjacent to but spaced slightly inwardly of the base end of each member 14. Another annular groove 42 is formed in the outer peripheral surface of each of the members 14, and is spaced slightly from the inner edge of the groove 40.

A split follower or bearing ring 44, of suitable metal such as bronze, is disposed within the groove 40 and is adapted to abut against the base edge thereof. An annular packing member 46, of suitable packing material and preferably formed of a plurality of nesting V-shaped elements, is disposed within the groove 40 with one edge thereof abutting against the opposite edge of the groove 40 and with its other edge engaged by and abutting against the adjacent edge of the follower 44.

A split stop ring 48, which is generally L-shaped in cross section, is disposed within the groove 42 with the leg portion thereof engaging that peripheral portion of the member 14 between the grooves 40 and 42 and with the edge thereof abutting against the adjacent edge of the packing member 46. Such member 48 may be formed of suitable metal, such as bronze.

It will thus be seen that the members 40, 44 and 42 project radially beyond the peripheral surface of member 14, and are adapted to bear against the inner surface of the adjacent member 14 or the member 12.

The members 14, with the exception of the innermost one, are provided with annular stop nuts 50, which are threaded to the threaded portions 32 of the members 14 and which provide inner, annular bearing surfaces 52. Such bearing surfaces 52 are adapted to bear against the outer peripheral surfaces of the adjacent members 14.

Suitable hydraulic connections (not shown) are provided for introducing fluid under pressure into the base end of the member 12, so that such fluid under pressure extends the elements 14 with respect to each other and with respect to the outer member 12. As such members 14 are extended, it will be appreciated that the members 44, 46 and 48 bear against the inner surfaces of the adjacent members 14 and 12, and when in their fully extended positions the stop rings 48 abut against the stop nuts 50 or 20 to limit the relative movement of the members 14 with respect to each other and with respect to the member 12.

Each of the members 50 is provided with an annular groove and annular packing elements similar to the groove 26 and packing element 28, which is adapted to abut against the outer surface of the adjacent member 14.

From the above description, it will be evident that the present invention provides a simplified structure which accomplishes the objects pointed out hereinabove.

What is claimed is:

1. In an hydraulic hoist construction, a plurality of telescopically disposed cylindrical members, said members being disposed in radially spaced relation with respect to each other, means providing a groove in the outer surface of an inner one of said cylindrical members, and sealing means disposed within said groove adapted to bear against the inner surface of the adjacent cylindrical member, said sealing means including an annular packing member within said groove, and a metal ring member disposed within said groove and engaging one edge of said packing member, and annular means engaging the opposite edge of said packing member.

2. In an hydraulic hoist construction, a plurality of telescopically disposed cylindrical members, said members being disposed in radially spaced relation with respect to each other, means providing a groove in the outer surface of an inner one of said cylindrical members, and sealing means disposed within said groove adapted to bear against the inner surface of the adjacent cylindrical member, an annular packing member within said groove and projecting radially beyond the peripheral surface of said one of said cylindrical members, a metal split ring member disposed within said groove and projecting radially beyond the peripheral surface of said one of said cylindrical members and engaging one edge of said packing member, and annular means engaging the opposite edge of said packing member.

3. In an hydraulic hoist construction, a plurality of telescopically disposed cylindrical members, said members being disposed in radially spaced relation with respect to each other, means providing a groove in the outer surface of an inner one of said cylindrical members adjacent to and spaced inwardly of the base thereof, and sealing means disposed within said groove adapted to bear against the inner surface of the adjacent cylindrical member, an annular packing member within said groove and projecting radially beyond the peripheral surface of said one of said cylindrical members, a metal split ring member disposed within said groove and projecting radially beyond the peripheral surface of said one of said cylindrical members and engaging one edge of said packing member, and annular means engaging the opposite edge of said packing member.

4. In an hydraulic hoist construction, a plurality of telescopically disposed cylindrical members, said members being disposed in radially spaced relation with respect to each other, means providing a groove in the outer surface of an inner one of said cylindrical members adjacent to and spaced inwardly of the base thereof, and sealing means disposed within said groove adapted to bear against the inner surface of the adjacent cylindrical member, an annular packing member within said groove and projecting radially beyond the peripheral surface of said one of said cylindrical members, a metal split ring member disposed within said groove and projecting radially beyond the peripheral surface of said one of said cylindrical members and engaging one edge of said packing member, and a split stop ring engaging the opposite edge of said packing member and projecting radially beyond the peripheral surface of said one of said cylindrical members.

5. In an hydraulic hoist construction, a plurality of telescopically disposed cylindrical members, said members being disposed in radially spaced relation with respect to each other, means providing a groove in the outer surface of an inner one of said cylindrical members adjacent to and spaced inwardly of the base thereof, sealing means disposed within said groove adapted to bear against the inner surface of the adjacent cylindrical member, an annular packing member within said groove and projecting radially beyond the peripheral surface of said one of said cylindrical members, a metal split ring member disposed within said groove and projecting radially beyond the peripheral surface of said one of said cylindrical members and engaging one edge of said packing member, and annular means engaging the opposite edge of said packing member, and an annular bearing member secured to the head end of said adjacent cylindrical member and projecting radially inwardly thereof, said stop ring being adapted to abut against said annular bearing member when said cylindrical members are extended with respect to each other.

WILLIAM L. KOMPH, Sr.